United States Patent [19]
Rostoker et al.

[11] Patent Number: 5,784,572
[45] Date of Patent: Jul. 21, 1998

[54] METHOD AND APPARATUS FOR COMPRESSING VIDEO AND VOICE SIGNALS ACCORDING TO DIFFERENT STANDARDS

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 580,547

[22] Filed: Dec. 29, 1995

[51] Int. Cl.$^6$ .......................... H04N 7/167; H04N 7/52; H04B 1/66
[52] U.S. Cl. .......................... 395/200.77; 395/200.61; 395/200.62; 395/200.64; 395/200.66; 364/715.02; 348/14; 348/17; 348/423; 348/384; 386/27; 386/33; 386/39; 386/109
[58] Field of Search .................. 364/514 A, 514 R, 364/514 C, 514 B, 715.02; 348/423, 512, 514–515, 500, 384, 390, 14, 17; 386/26, 27, 33, 39, 40, 46, 48, 109, 111, 124; 395/200.77, 200.61–64, 200.66, 200.34

[56] References Cited

U.S. PATENT DOCUMENTS

| 5,343,513 | 8/1994 | Kay et al. ........................... 379/59 |
| 5,347,305 | 9/1994 | Bush et al. ........................... 348/14 |
| 5,392,223 | 2/1995 | Caci ................................... 364/514 |
| 5,430,485 | 7/1995 | Lankford et al. .................... 348/423 |
| 5,467,139 | 11/1995 | Lankford ............................. 348/512 |
| 5,506,903 | 4/1996 | Yamashita ........................... 380/19 |
| 5,537,409 | 7/1996 | Moriyama et al. .................. 370/84 |
| 5,548,532 | 8/1996 | Menand et al. ................... 395/200.77 |
| 5,550,580 | 8/1996 | Zhou ................................... 348/15 |
| 5,594,660 | 1/1997 | Sung et al. ....................... 364/514 R |
| 5,598,352 | 1/1997 | Rosenau et al. ................. 364/514 A |
| 5,617,502 | 4/1997 | Ort et al. ............................ 386/97 |
| 5,619,197 | 4/1997 | Nakamura .......................... 341/50 |
| 5,619,528 | 4/1997 | Rebee et al. ....................... 375/219 |
| 5,621,660 | 4/1997 | Chaddha et al. ................. 395/200.77 |

Primary Examiner—Emanuel T. Voeltz
Assistant Examiner—Tuan Q. Dam
Attorney, Agent, or Firm—Oppenheimer Wolff & Donnelly LLP

[57] ABSTRACT

Disclosed herein is a method and apparatus for compressing and decompressing audio and video signals. The audio and video signals can be compressed and decompressed according to different standards, such as MPEG-1 and MPEG-2. The audio and video signals can also be compressed and decompressed at different rates. Compression rates can be varied to fit the audio and video signals into a narrow transmission bandwidth, such as an RF transmission bandwidth.

24 Claims, 2 Drawing Sheets

METHOD AND APPARATUS FOR COMPRESSING VIDEO AND VOICE SIGNALS ACCORDING TO DIFFERENT STANDARDS

BACKGROUND OF THE INVENTION

The invention relates in general to digital communications and in particular to an apparatus and method of compressing video and audio signals.

Three well-known standards for compressing digitally-transmitted pictures include JPEG, CCITT H.261, and MPEG. JPEG is a standard developed by the Joint Photographers Experts Group. It sets forth a basic technique for encoding still-frame video.

CCITT H.261 is a standard developed by the International Consultive Committee for Telephony and Telegraphy. It is used for video teleconferencing and video telephony applications. CCITT H.261 can operate between 64 kilobits (Kbits) per second and 1.92 megabits (Mbits) per second, and can operate upon images having between 525 and 625 lines based upon a common intermediate format.

MPEG is a standard established by the Moving Pictures Experts Group of the International Standardization Organization. MPEG specifies a format for the encoding of compressed full-motion video, including motion vectors. The distinguishing feature of MPEG over CCITT H.261 is that MPEG provides higher quality images. One distinguishing feature of MPEG over JPEG is that MPEG compresses full-motion video, whereas JPEG compresses still-frame video. Another distinguishing feature is that MPEG provides a synchronized audio signal along with the compressed video signal. JPEG, in contrast, provides no audio signal at all.

MPEG-1 encoding allows the reproduction of full-motion video from a data stream rate of only 1.2 Mbits per second. That rate is low enough to reproduce video imagery from video signals stored on Compact Discs (CD-ROMs), digital audio tapes, magnetic hard drives, or from signals received via some other data channels of similar bandwidth.

MPEG-2 is similar to MPEG-1, except that it includes extensions to cover a wider range of applications. The primary application of MPEG-2 is direct broadcast television, in which digital signals carrying TV quality video are transmitted by a satellite to dish antennas. The digital signals are transmitted on the Ku-band, and the video is coded at bit rates between 3 and 9 Mbits per second.

Efforts are now being made to add TV quality video capability to cellular telephones. Before these efforts can succeed, however, a problem arising from bandwidth limitation must be overcome. Current cellular telephone systems operate on a radio frequency of 900 MHZ. Yet even with the use of sophisticated compression routines, the bandwidth of a cellular telephone system is not wide enough to transmit the enormous amount of video and voice information that is required to display high quality, full-motion video. MPEG in general does not readily support the slower transmission rates of the cellular telephones. Bandwidth limitation may not be a problem for high frequency satellite transmissions, but it is a problem for the comparatively low frequency radio transmissions.

Therefore, it is an objective of the present invention to transmit TV quality video at radio frequencies.

It another objective of the present invention to add flexibility for compressing video and audio signals.

SUMMARY OF THE INVENTION

The bandwidth limitation problem is addressed by the present invention. According to a broad aspect of the present invention, apparatus for compressing and decompressing first and second signals comprises a first processor for processing the first signal; a second processor for processing the second signal; and computer memory for storing a plurality of instruction sets corresponding to various compression and decompression algorithms. The first processor is programmed by a first instruction set which is selected from the plurality of instruction sets stored in the computer memory. The second processor is programmed by a second instruction set which is selected from the plurality of instruction sets stored in the computer memory.

The bandwidth can be dynamically allocated among the first and second signals. Dynamic allocation is performed by varying the compression rates of the first and second signals. Compression rates are varied until the first and second signals fit within their allocated bandwidths.

DETAILED DESCRIPTION OF THE PREFERRED EMBODIMENTS

Figure 1:
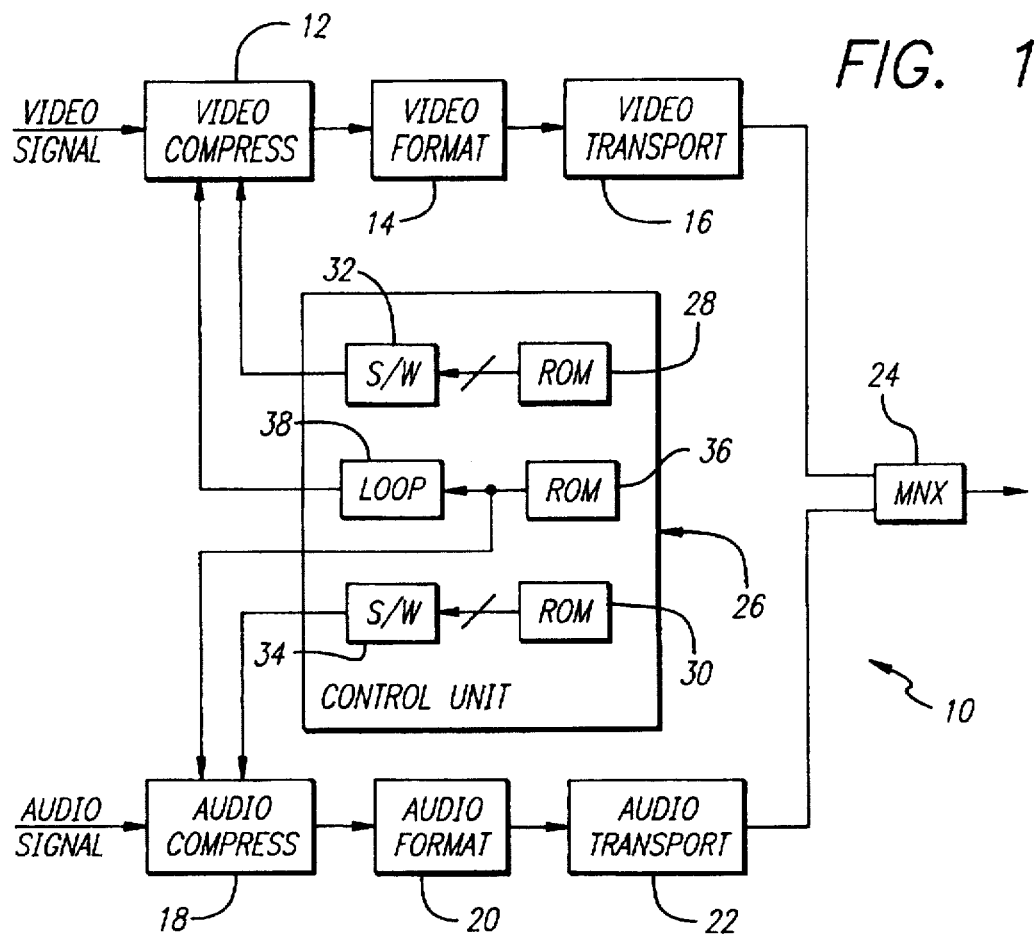
FIG. 1 is a block diagram of a compression apparatus according to the present invention.

FIG. 1 shows an apparatus 10 for compressing digital video and audio signals. The video signal is supplied to a video signal compression unit 12, which includes a digital signal processor for compressing the video signal according to a standard such as the MPEG standard. The MPEG standard defines a versatile signal format which includes both intraframe coding and motion compensated predictive coding. The basic scheme is to predict motion from frame to frame in the temporal direction, and then to use Discrete Cosine Transforms (DCTs) to organize the redundancy in the spatial directions.

According to the MPEG standard, the compressed signals are broken up into a plurality of transport packets. Each packet includes a packet header followed by packet data. There are either audio transport packets or there are video transport packets, but there are no transport packets carrying both video and audio. In a motion picture there are typically seven video packets for every audio packet.

The packet headers are generated by a video formatter 14. Each packet header includes a Start_Code, a stream_ID, a Packet_length, a Presentation_Time_Stamp, and a Decoding_Time_Stamp. The Packet_length indicates the number of data bytes in the packet data. The packet data includes about 1 to 4 KB of encoded and compressed data. The data in the consecutive packets is treated as a continuous bit stream.

The Time_Stamps, which indicate the position of the packet data relative to the beginning of the video, are used for the synchronization of audio and video.

The stream_ID identifies whether the packet data contains video or audio. The stream_ID also indicates whether the first few bytes of packet data include a compression rate and a compression type. As will be seen below, the invention utilizes variable compression rates and different types of algorithms for compression and decompression.

A transport processor 16 divides the compressed video signal into packets of data and adds a packet header to each packet data.

The audio signal is supplied to an audio signal compression unit 18, which also includes a digital signal processor for performing compression. Audio signals may also be compressed according to an MPEG standard.

An audio formatter 20 generates packet headers for the compressed audio signal. An audio transport processor 22 divides the audio signal into packets of data and adds a packet header to each packet data.

The video and audio transport packets are supplied to a multiplexer 24, which time division multiplexes the audio and video packets into a single stream.

A control unit 26 allows the video and audio signals to be compressed according to different compression algorithms, such as MPEG-1, MPEG-2, MPEG-3 and MPEG-4. The audio signal could even be compressed by a Dolby AC3 algorithm. Sets of digital signal processor instructions for executing the algorithms are stored in first and second groups of Read Only Memory (ROM) 28 and 30. Each ROM 28 in the first group stores an instruction set for executing a video compression algorithm, and each ROM 30 in the second group stores an instruction set for executing an audio compression algorithm. The first group of ROMs 28 could store the same instruction sets as the second groups of ROMs 30, or it could store different instruction sets.

Outputs from the first group of ROMs 28 are coupled to inputs of a first switching circuit 32. Based on a user input, the first switching circuit 32 selects an ROM 28 in the first group and couples an output of the selected ROM 28 to the digital signal processor of the video compression unit 12. The digital signal processor of the video compression unit 12 is thus programmed to perform video compression in accordance with the instruction set stored in the selected ROM 28.

Also in response to the user input, a second switching circuit 34 selects a ROM 30 in the second group and couples an output of the selected ROM 30 to the digital signal processor of the audio compression unit 18. The digital signal processor of the audio compression unit 18 is thus programmed to perform audio compression in accordance with the instruction set stored in the selected ROM 30.

Among the available options, the user can select the same compression algorithms for the video and audio signals. Or, the user can select different algorithms for the video and audio signals, such as MPEG-2 for video and Dolby AC3 for audio.

Not only can the types of compression algorithms be varied, but the compression rates can also be varied. MPEG supports varying compression rates dependent on space, time, and motion factors of the video. By varying the compression rates, the bandwidth can be allocated among the audio and video signals. This is especially valuable when the bandwidth of transmission is too narrow to handle normally compressed video and audio signals, as is the with RF bandwidths.

When compression rate and type is varied, the formatter 14 or 20 indicates in the stream_ID that the compression rate and type are indicated in the first few bytes of the packet data. The transport processor 16 or 22 adds the compression rate and type to the packet data. The compression rate and types are used later for decompression of the video and audio signals.

Figure 2:
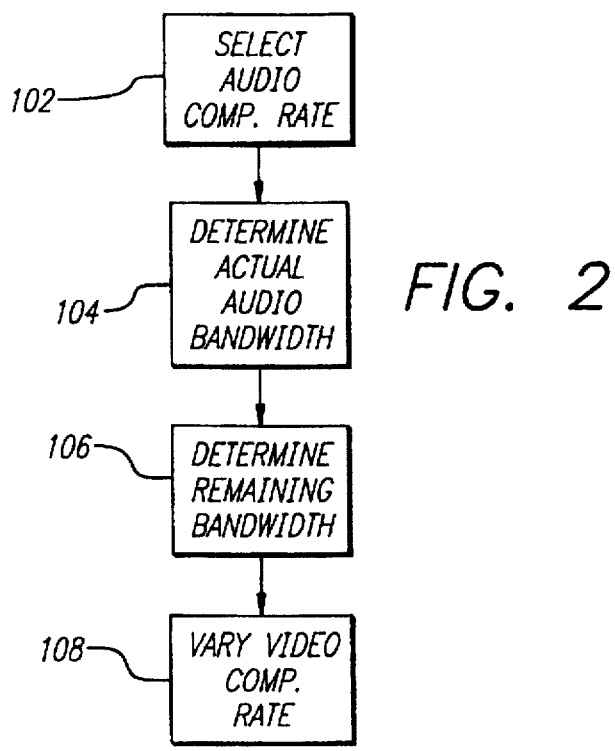
FIG. 2 is a flowchart for the allocation of bandwidth among audio and video signals.

Additional reference is made to FIG. 2, which shows an approach for allocating the bandwidth among the video and audio signals. A compression rate for audio is selected (step 102), the bandwidth occupied by the compressed audio signal is determined (step 104), the remaining bandwidth available for the video signal is determined (step 106), and the compression rate for video is adjusted until the video signal can fit into the remaining portion of the bandwidth (step 108). Selection of the audio compression rate is made by a user input. A ROM 36 stores a graduated scale of compression rates for audio. A compression rate for high audio fidelity is stored at one end of the scale, a rate for low sound fidelity is stored at the other end of the scale, and intermediate rates are stored therebetween.

The remaining bandwidth for the video signal can be determined by subtracting the overall bandwidth from the bandwidth actually utilized by the audio signal. The video compression rates can then be adjusted by a control loop 38 to fit the video within the remaining bandwidth. The control loop adjusts the video compression rate until the bandwidth actually utilized by the video signal is equal to the remaining bandwidth.

A different approach for allocating bandwidth among the video and audio signals (not shown) would specify the bandwidth for both audio and video, and then adjust both compression rates until the audio and video signals fit within their allocated bandwidths. The specified bandwidths would be stored as apriori values in ROM, and the compression rates would be adjusted by control loops.

Using either approach, audio fidelity is increased and image quality is decreased by selecting a lower compression rate (increasing the bandwidth) for audio. Conversely, audio fidelity is decreased and image quality is increased by selecting a higher compression rate (decreasing the bandwidth) for audio. In this manner, the user can maximize sound fidelity at the expense of image quality, or the user can enhance image quality at the cost of sound fidelity.

Figure 3:
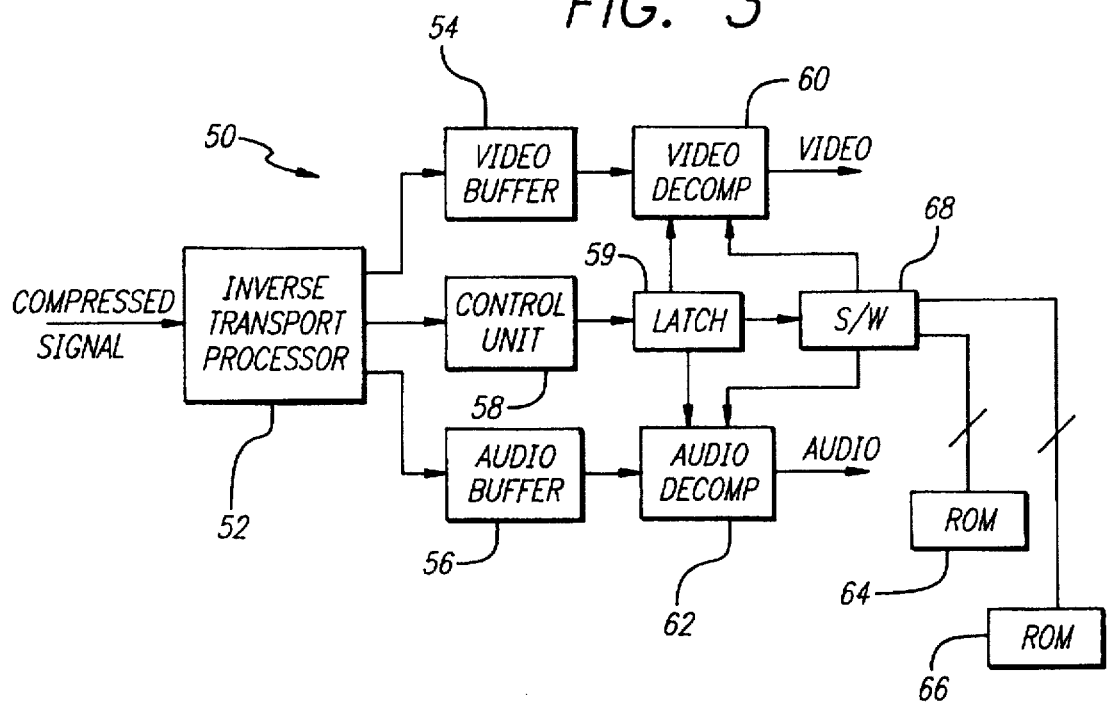
FIG. 3 is a block diagram of a decompression apparatus according to the present invention.

FIG. 3 shows an apparatus 50 for decompressing the video and audio signals. A compressed signal containing both video audio is supplied to an inverse transport processor 52, which separates the packet headers from the packet data, sends the packet data containing video to a video buffer 54, sends the packet data containing audio to an audio buffer 56 and sends the packet headers to a control unit 58. If the stream_ID indicates that compression rates and types are stored in the first few bytes of data, the control unit 58 extracts the compression rate and type from the packet data and stores them in a latch 59. The compressed video and audio signals stored in the buffers 54 and 56 are accessed on demand by the video and audio decompression units 60 and 62. The compression rates are supplied by the latch 59 to the decompression units 60 and 62, both of which include digital signal processors. First and second groups of ROMs 64 and 66 store instruction sets for decompressing the video and audio signals. ROMs 64 and 66 in the first and second groups are selected by a switching circuit 68 according to the compression types, which are stored in the latch 59. Outputs of the selected ROMs 64 and 66 are coupled by the switching circuit 68 to the decompression units 60 and 62. The digital signal processors of the first and second decompression units 60 and 62 are thus programmed to decompress the audio and video signals according to the instruction sets stored in the selected ROMs 64 and 66. The outputs of the decompression units 60 and 62 provide decompressed video and audio signals for reproduction or for storage.

When the audio and video signals are reproduced, the time stamps are used for resynchronization. The Time_Stamps of the decompressed audio and video signals cannot be compared directly to provide synchronization because the respective packets are generated at different instants. Thus, the respective Time_Stamps are compared to a reference clock signal. When the audio and video time stamps are equal, the audio signal is reproduced in synchronization with the video signal.

Figure 4:
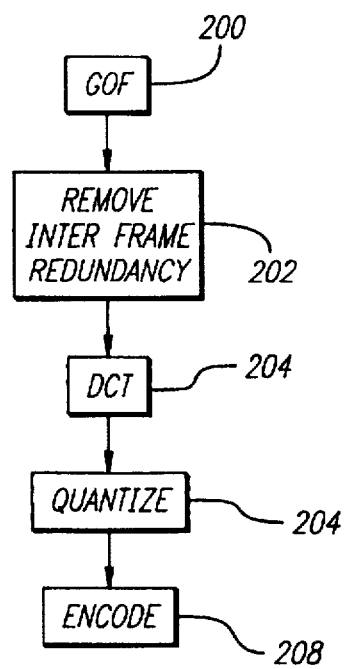
FIG. 4 is a block diagram of a compression technique according to the MPEG standard.

FIG. 4 shows a compression technique according to the MPEG standard. Under the MPEG standard, the video signal is divided into Groups of Frames (GOFs), and each frame is divided into macroblocks of 16×16 pixels (step 200). Each macroblock is represented by one or more 8×8 matrices of luminance and chrominance values. In a 4:2:2 representation of the macroblock, for example, a luminance value is provided for every pixel, yielding four 8×8 luminance matrices. Blue and red chrominance values are provided for each pixel in the same macroblock, yielding two 8×8 blue chrominance matrices and two 8×8 red chrominance matrices.

Digressing briefly, colors are specified using the YUV model, an ordered triple or Cartesian coordinate describing the color's location with respect to three orthogonal axes: the luminance (Y-) axis and the blue and red (U- and V-) chrominance axes. Luminance is an attribute of color related to a color's brightness or darkness, and chrominance is an attribute describing the color apart from its luminance. The Y-axis is located along a major diagonal of the color gamut between black and white. Black has zero luminance and is therefore considered to be located at the origin of the coordinate system. White, however, has the maximum luminance and is located at the opposite vertex of the color gamut. Located along the luminance axis between black and white are grays of various luminances.

The U-chrominance axis generally runs in the blue-yellow direction, while the V-chrominance axis runs generally in the red-green direction. The direction of a color from the Y-axis is its hue. The color's distance from the Y-axis is its saturation.

Now, back to the MPEG standard. Interframe redundancy is removed from the color motion picture frames (step 202). To remove interframe redundancy, each frame is designated either "intra", "predicted" or "interpolated" for coding purpose. The value of every pixel in an intra frame (I-picture) is independently provided. That is, the I-picture is a still image, not using any past history. In a prediction frame (P-picture), only the incremental changes in pixel values from the last I-picture or P-picture are coded. That is, the P-picture contains the bits of the image which are different than the bits of the frame from which the image of the P-picture is to be derived. The P-picture typically includes a temporal time-stamp indicating the relative time-wise offset of the P-frame from the frame from which it is derived. In an interpolation frame (B-picture), the pixel values are coded with respect to both an earlier frame and a later frame. The B-picture can also include a temporal time-stamp.

Typically an I-picture is larger (includes more data) than a P-picture, which in turn is larger than a B-picture. The ratio of I-, to, P- to B-pictures in a particular video varies greatly, depending on the encoder algorithm used and the type of motion and detail of the images represented by the frames.

Note that the MPEG standard does not require frames to be stored in strict time sequence. Thus, the intraframe from which a predicted frame is coded can be provided in the picture sequence either earlier or later in time as the predicted frame. By coding frames incrementally, using predicted and interpolated frames, much interframe redundancy can be eliminated to result in tremendous savings in storage.

Motion of an entire macroblock can be coded by a motion vector, rather than at the pixel level, thereby providing further data compression.

Next is the removal of intraframe redundancy. A 2-dimensional discrete cosine transform (DCT) is performed on each of the 8×8 matrices to map the spatial luminance or chrominance values into the frequency domain (step 204).

Each element of the 8×8 matrix is weighted in accordance with its chrominance or luminance type and its frequency (step 206). This process is called "quantization." In an I-picture, the quantization weights are intended to reduce the frequency components to which the human eye is not sensitive. In P- and B-pictures, which contain mostly higher frequency components, the weights are not related to visual perception. Having created many zero elements in the 8×8 matrix, each matrix can now be represented without information loss as an ordered list of a "DC" value, and alternating pairs of a non-zero "AC" value and a length of zero elements following the non-zero value.

The final step is entropy encoding (step 208), which further compresses the representations of the DC block coefficients and the AC value-run length pairs using variable length codes. Under entropy encoding, the more frequently occurring symbols are represented by shorter codes. Further efficiency in storage is thereby achieved.

Figure 5:
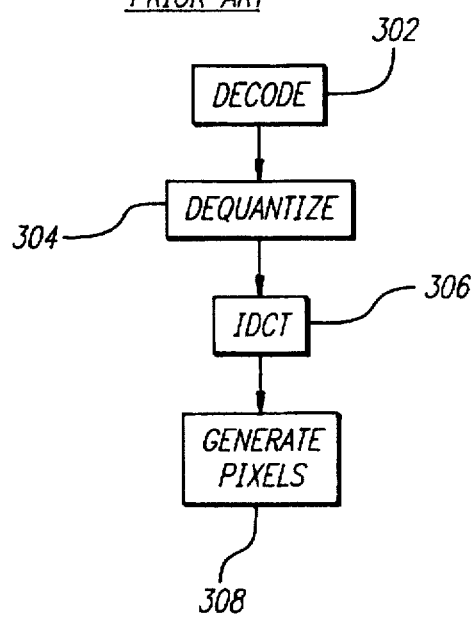
FIG. 5 is a block diagram of a decompression technique according to the MPEG standard.

Decompression, shown in FIG. 5, is performed essentially by reversing steps 202–208. A compressed signal is decoded (step 302), dequantized (step 304) and transformed by a two-dimensional inverse DCT(step 306). Finally, pixels are generated for reproduction (step 308).

Thus disclosed is an apparatus that can compress audio and video signals according to different standards. The standards can be selected by a user.

Also disclosed is an apparatus that dynamically allocates bandwidth between audio and video signals by varying the compression rates of the audio and video signals. The user has the flexibility of changing the compression rates of audio and video in a separable and distinct manner. If the user desires high fidelity audio, the compression rate for audio is maximized and given highest priority. The remaining bandwidth is allocated to the video signal. The apparatus is applicable to RF communication systems, which have narrow bandwidths for transmitting audio and video signals.

Although separate elements are shown in FIGS. 1 and 3, many of these elements can be combined into a single processor and placed onto a single chip. For example, it is possible to have a single processor perform the functions of the formatter, transporter and compression unit. It is also possible to have a single processor perform both compression and decompression, since the single processor is selectively programmed by external ROMs.

It is understood that various changes and modifications may be made without departing from the spirit and scope of the invention. It is also understood that the invention is not limited to the transmission of audio and video signals. The invention could be modified to compress data signals and transmit the compressed data signals along with, or instead of, the video and audio signals. For example, still images in the data signal could be compressed using a JPEG technique. The compressed images could be formatted and transported, and then multiplexed with the video and audio signals. Finally, it is understood that use of the invention is not limited to RF communication systems, but could be applied to any system plagued by bandwidth limitations. Thus, the present invention is not limited to the precise embodiment described hereinabove.

We claim:

1. Apparatus for variably compressing first and second signals in order to contemporaneously fit both said first and said second signals in compressed form into an available band width with each compressed signal utilizing a corresponding portion of said available band width, the apparatus comprising;

a first processor for processing the first signal;

a second processor for processing the second signal; and computer memory for storing a plurality of instruction sets each corresponding to respective different compression algorithms;

the first processor being programmed by a first instruction set which is selected from the plurality of instruction sets stored in the computer memory in order to compress said first signal to utilize a corresponding first portion of said available band width;

the second processor being programmed by a second instruction set which is selected from the plurality of instruction sets stored in the computer memory in order to compress said second signal to substantially utilize a corresponding second portion of said available band width, which second portion is equal to said available band width minus said first portion.

2. The apparatus of claim 1, wherein the computer memory includes first and second pluralities of memory devices, each memory device in the first plurality storing an instruction set for compressing the first signal, each memory device in the second plurality storing an instruction set for compressing the second signal;

wherein the apparatus includes a first selector switch for selecting the first instruction set from a memory device in the first plurality; and wherein the apparatus includes a second selector switch for selecting the second instruction set from a memory device in the second plurality.

3. The apparatus of claim 1, further comprising:

a memory device for storing a plurality of compression rates corresponding to the first signal;

a user input for selecting a compression rate from the memory device for use by the first processor; and a control loop for generating a compression rate corresponding to the second signal, the compression rate corresponding to the second signal being used by the second processor;

wherein the first and second processors compress the first and second signals according to the corresponding compression rates.

4. The apparatus of claim 3, wherein the first signal is an audio signal, and wherein the second signal is a video signal.

5. The apparatus of claim 1, further comprising:

a memory device for storing a plurality of bandwidth sets, each bandwidth set including a first bandwidth for the first signal and a second bandwidth for the second signal;

a user input for selecting a bandwidth set from the memory device; and a control loop for compressing the first and second signals to fit within the first and second bandwidths of the selected bandwidth set.

6. The apparatus of claim 5, wherein the first signal is an audio signal, and wherein the second signal is a video signal.

7. The apparatus of claim 1, wherein the first and second signals are compressed by the first and second processors, and wherein the apparatus further comprises:

a formatter which generates packet headers for the compressed signals; and a transport processor which divides the compressed signals into packet data and which adds a packet header to each packet data.

8. The apparatus of claim 7, wherein the packet headers generated by the formatter include an identifier indicating whether a compression rate and type are stored in the first few bytes of packet data; and wherein the transport processor adds the compression rate and type to the packet data.

9. The apparatus of claim 1, wherein the first and second signals are compressed by the first and second processors, and wherein the apparatus further comprises:

a first formatter which generates first packet headers for the first signal;

a first transport processor which divides the first signal into first packet data and which adds a first packet header to each first packet data;

a second formatter which generates second packet headers for the second signal;

a second transport processor which divides the second signal into second packet data and which adds a second packet header to each second packet data; and a multiplexer for multiplexing together the outputs of the first and second transport processors.

10. The apparatus of claim 1, wherein the computer memory includes:

first and second pluralities of memory devices, each memory device in the first plurality storing an instruction set for decompressing the first signal, each memory device in the second plurality storing an instruction set for decompressing the second signal;

wherein the apparatus includes a first selector switch for selecting the first instruction set from a memory device in the first plurality; and wherein the apparatus includes a second selector switch for selecting the second instruction set from a memory device in the second plurality.

11. The apparatus of claim 10, wherein the first and second signals are decompressed by the first and second processors, and wherein the apparatus further comprises:

a buffer;

a latch; and an inverse transport processor, responsive to the first and second compressed signals, for sending packet data to the buffer and for sending compression rates to the latch;

wherein the first and second processors access the packet data in the buffer and compression rates in the latch to decompress the first and second signals.

12. The apparatus of claim 11, wherein the first and second signals are audio and video signals, and wherein the apparatus further comprises means for synchronizing the audio and video signals after being outputted from the first and second processors.

13. Apparatus for compressing audio and video signals, comprising:

a first plurality of memory devices which each store different audio compression instruction sets for compressing the audio signal;

a first processor that is programmable to compress the audio signal, the first processor being programmed by a selected one audio compression instruction set stored in a selected one of the memory devices of the first plurality;

an audio formatter for generating packet headers for the compressed audio signal;

an audio transport processor for dividing the compressed audio signal into audio packet data and for adding an audio packet header to each audio packet data;

a second plurality of memory devices which each store different video compression instruction sets for compressing the video signal;

a second processor that is programmable to compress the video signal, the second processor being programmed by a selected one video compression instruction set stored in a selected one of the memory devices of the second plurality;

a video formatter for generating video packet headers for the compressed video signal;

a video transport processor for dividing the compressed video signal into video packet data and for adding a video packet header to each video packet data;

a multiplexer for multiplexing together the outputs of the first and second transport processors; and a control loop for selecting one instruction set from said first plurality of memory devices and one instruction set from said second plurality of memory devices for respectively programming said first and said second processors in order to compress the audio and video signals to fit together within a predetermined bandwidth.

14. The apparatus of claim 13, further comprising:

an additional memory device for storing a plurality of different compression rates corresponding to the audio signal; and a user input for selecting an audio compression rate from the additional memory device;

wherein the control loop determines a necessary video compression rate from the audio compression rate; and corresponding portion of said available band width which is utilized by the compressed audio signal, said control loop selecting an instruction set from said second plurality of memory devices to effect said necessary video compression;

wherein the first and second processors compress the respective audio and video signals according to the corresponding compression rates.

15. The apparatus of claim 13, further comprising:

an additional memory device for storing a plurality of bandwidth sets, each bandwidth set including a bandwidth for the audio signal and a bandwidth for the video signal; and a user input for selecting a bandwidth set from the additional memory device.

16. Apparatus for decompressing audio and video transport packets, each packet including a packet header and packet data, a packet header indicating whether the corresponding packet data includes a compression rate and type, the apparatus comprising:

a buffer;

a latch;

a first plurality of memory devices which store different instruction sets for decompressing the audio packet data;

a second plurality of memory devices which store different instruction sets for decompressing the video packet data;

an inverse transport processor, responsive to the audio and video transport packets, for storing packet data in the buffer and for storing the compression rates and types in the latch;

a first digital signal processor for decompressing the audio packet data stored in the buffer at the rate specified in the latch, the first digital signal processor being programmed to perform decompression by the instruction set stored in a selected one of the memory devices in the first group; and a second digital signal processor for decompressing the video packet data stored in the buffer at the rate specified in the latch, the second digital signal processor being programmed to perform decompression by the instruction set stored in a selected one of the memory devices in the second group.

17. The apparatus of claim 16, wherein the memory devices of the first and second groups are selected in accordance with the compression types stored in the latch.

18. A method for variably compressing and decompressing first and second signals in order to contemporaneously fit both the compressed first and second signals into an available band width , said method comprising steps of:

storing in computer memory a plurality of instruction sets each corresponding to different algorithms for signal compression and decompression;

selecting first and second instruction sets from the plurality of instruction sets in the computer memory;

programming a first processor with the first selected instruction set to compress and decompress the first signal; and programming a second processor with the second selected instruction set to compress and decompress the second signal.

19. The method of claim 18, further comprising the step of varying the rates at which the audio and video signals are compressed, the rates being varied to keep the audio and video signals within a relatively constant bandwidth.

20. The method of claim 19, wherein the compression rates are varied by:

storing in computer memory a plurality of compression rates corresponding to the first signal;

selecting a compression rate for use by the first processor; and generating a compression rate for use by the second processor, the second rate being generated from the first rate.

21. A method of compressing audio and video signals, comprising the steps of:

storing in computer memory a first plurality of instruction sets for compressing the audio signal;

selecting a first instruction set from the first plurality;

programming a first processor with the selected first instruction set, the first processor being programmed to compress the audio signal;

generating audio packet headers for the compressed audio signal;

dividing the compressed audio signal into audio packet data;

adding an audio packet header to each audio packet data to form audio transport packets;

storing in computer memory a second plurality of instruction sets for compressing the video signal;

selecting a second instruction set from the second plurality;

programming a second processor with the selected second instruction set, the second processor being programmed to compress the video signal;

generating video packet headers for the compressed video signal;

dividing the compressed video signal into video packet data;

adding a video packet header to each video packet data to form video transport packets; and multiplexing together the video and audio transport packets into a single stream.

22. The method of claim 21, further comprising the steps of:

storing in computer memory a plurality of audio compression rates;

selecting an audio compression rate from the first plurality; and generating a video compression rate from the selected audio compression rate;

wherein the audio and video signals are compressed at the audio and video compression rates.

23. The method of claim 21, further comprising the steps of:

storing in computer memory a plurality of audio and video bandwidths;

selecting an audio bandwidth and a video bandwidth from the plurality of bandwidths; and generating audio and video compression rates from the selected bandwidths;

wherein the audio and video signals are compressed at the generated rates.

24. A method of decompressing audio and video transport packets, each packet including a packet header and packet data, a packet header indicating whether the corresponding packet data includes a compression rate and type, the method comprising the steps of:

storing in computer memory a first plurality of instruction sets for decompressing the audio transport packets;

selecting a first instruction set from the first plurality;

storing in computer memory a second plurality of instruction sets for decompressing the video transport packets;

selecting a second instruction set from the second plurality;

storing audio packet data in one area of memory and video packet data in another area of memory;

determining whether compression rate and type are included in the packet data;

storing the compression rate and type in yet another area of memory;

programming a first digital signal processor to decompress the audio packet data at the stored rate, the first digital signal processor being programmed with the first instruction set; and programming a second digital signal processor to decompress the video packet data at the stored rate, the second digital signal processor being programmed with the second instruction set.

* * * * *